July 5, 1966 A. W. NICONCHUK 3,258,861
POLYURETHANE FOOTWEAR HEELS
Filed July 31, 1962 2 Sheets-Sheet 1
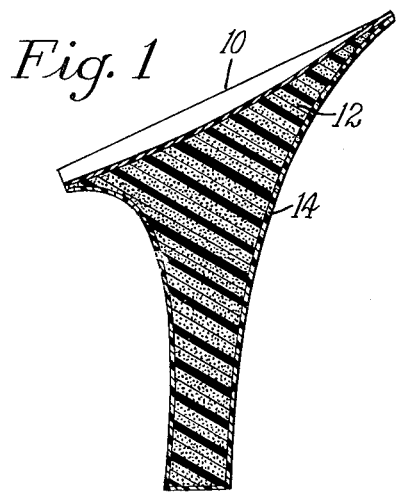
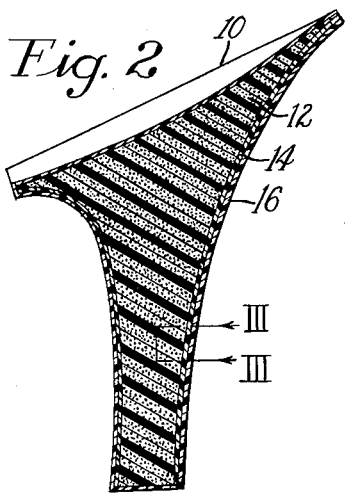
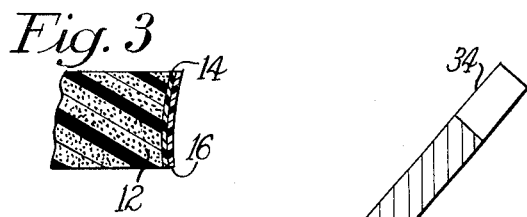
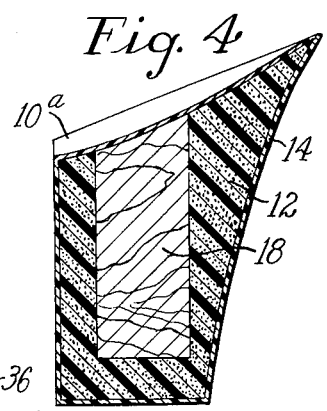
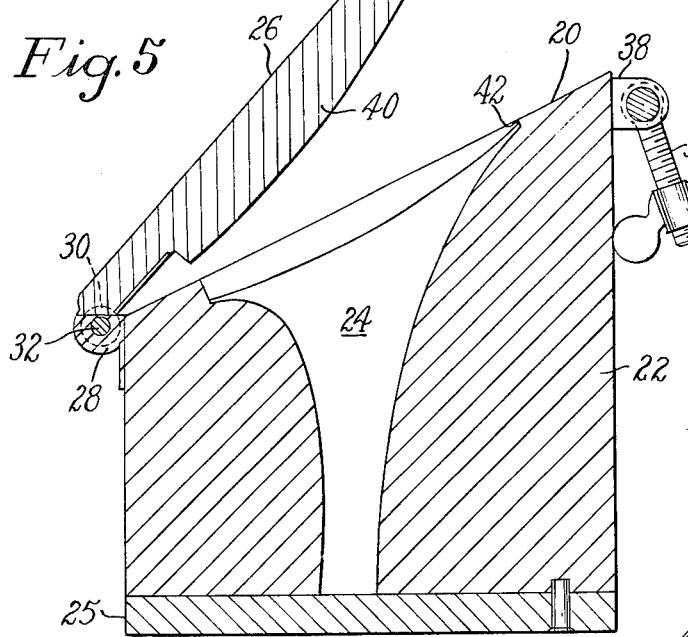
Inventor
Alec W. Niconchuk
By his Attorney July 5, 1966   A. W. NICONCHUK   3,258,861
POLYURETHANE FOOTWEAR HEELS
Filed July 31, 1962   2 Sheets-Sheet 2

United States Patent Office 3,258,861
Patented July 5, 1966

3,258,861
POLYURETHANE FOOTWEAR HEELS
Alec W. Niconchuk, Peabody, Mass., assignor to United Shoe Machinery Corporation, Boston, Mass., a corporation of New Jersey
Filed July 31, 1962, Ser. No. 213,674
7 Claims. (Cl. 36—34)

The present invention relates to footwear heels and more specifically to footwear heels of molded polyurethane foam.

Polyurethanes have been recognized as materials which should lend themselves admirably to the production of molded footwear heels. They may be formulated as liquid resins capable of conversion to rigid foamed condition by molding or casting techniques. As molded rigid foam they exhibit desirable properties, such as strength and resiliency recommending their use in producing a full spectrum of footwear heels; from thin, spike heels for ladies' shoes to low flat heels used on ladies', men's and children's shoes. Another property, density can also be predetermined so that heels obtained from molding polyurethanes, while having a foam structure, nevertheless can exhibit the ability to be nailed and have good nail retention, allowing in one instance heel lifts to be attached to the heels and in another instance the heels to be attached to shoe uppers each using conventional nailing procedures.

Molding footwear heels of rigid polyurethane foam may be conveniently carried out, using any of a number of known polyurethane molding procedures. In one method for this a prepolymer which may be the reaction product of an active hydrogen containing compound such as a hydroxyl terminated polyester and a molar excess of an organic polyisocyanate, is mixed with water and catalyst and poured into a heel mold where it undergoes an exothermic reaction to expand and solidify into a rigid foam of predetermined volume. In another method, one part of a polyhydroxy compound is reacted with a molar excess of polyisocyanate and a second part reacted with a molar deficiency of the polyisocyanate. A catalyst and a vaporizable liquid such as trichlorofluoromethane are mixed into the second part. Both parts are then mixed together and poured into a heel mold. In this method the exothermic heat of the reaction between the polyisocyanate and polyhydroxy compounds is sufficient to vaporize the volatile liquid and effect foaming coincidental with solidification. In a third method a polyhydroxy compound is reacted with a molar excess of polyisocyanate to provide an intermediate reaction product. Then, to provide foaming and solidification this product is reacted in a heel mold with a mixture of a volatile liquid and a low molecular weight polyhydroxy compound which is introduced in an amount sufficient to react with the remaining free isocyanate groups of the intermediate reaction product. A fourth method involves the simultaneous introductions of polyhydroxy compound, polyisocyanate, and a mixture containing water, catalyst and surfactant into a mixer from which the foamable mass is discharged directly into a heel mold where foaming and solidification of the mass are carried out to completion. A number of additional polyurethane molding procedures are also known, and can be used to mold footwear heels.

Difficulties have arisen to interfere with the broad utilization of polyurethane rigid foams in producing footwear heels by molding procedures. Perhaps the major of these results from the inability of the heels produced in this manner to be surface decorated or provided with a decorative or protective film or coating in a convenient manner using cellulose type lacquers. These lacquers of which nitrocellulose lacquers are the most commonly known, are convenient and economical to use in otherwise providing effective decorative and protective effects when sprayed onto the exposed surfaces of heels and allowed to dry. However, in the case of heels molded of rigid polyurethane foam, the film or coating which develops upon drying of the cellulose lacquer is easily lifted or chipped off the heel, particularly at the sharp corners which are characteristic in the design of many heels. This, reflects that less than a desirable amount of adhesive bonding develops between the molded rigid polyurethane foam and films or coatings deposited from cellulose type lacquers. As a result of this, molding of heels of rigid polyurethane foam has been presented with an alternative which is economically unattractive if not technically so, as well, that of using either relatively expensive decorating or surface coating materials and procedures, or resort to applying decorations coincidental with actual molding.

It is an object of this invention to provide footwear heels from molded, rigid polyurethane foam which are capable of effective surface decoration using cellulose type lacquers.

It is another object of this invention to provide footwear heels from molded rigid polyurethane foam having strongly adhered cellulose type films or coatings attached to the exterior surfaces thereof.

It is a more specific object of this invention to provide footwear heels molded of rigid, polyurethane foam, each having an exterior surface layer which is integrated in interfacial relationship with the foam, the surface layer being capable of effective decoration using cellulose type lacquers.

It is another more specific object of this invention to provide footwear heels molded of rigid polyurethane foam each having an exterior surface as described above, to which films or coatings developed on drying cellulose type lacquers strongly adhere.

It is another object of the invention to provide a molding process by which to produce the molded footwear heels described above.

These and other objects of the present invention are obtained in footwear heels of molded rigid polyurethane foam each of said heels comprising a shaped structure of rigid polyurethane foam adhesively bonded in interfacial relationship with a continuous surface layer of a thermoplastic synthetic polymeric material. Strong adhesion may be developed in turn between the surface layers of these heels and films or coatings deposited from nitrocellulose type lacquers applied to the layers. The molding process which is practiced in obtaining the featured footwear heel comprises the steps of (a) applying a thermoplastic synthetic polymeric material in fluid form to surfaces of a mold cavity of a footwear heel mold (b) allowing the applied thermoplastic synthetic polymeric material to solidify as a continuous layer of this material on the mold cavity surfaces. Following that (c) a foamable polyurethane in fluid form is introduced into the cavity, and (d) the polyurethane is allowed to expand and solidify into a shaped structure of rigid polyurethane foam which is integrated in interfacial relationship with the layer of thermoplastic synthetic polymeric material. The layer of thermoplastic synthetic polymeric material, which is adapted to be effectively decorated after molding with application and drying of cellulose type lacquers is positioned to the outer surface of the foam structure.

The manner in which the invention may be practiced will be described with reference to the accompanying drawings in which:

FIG. 1 is a diagrammatic side view in section of a molded spike heel produced in accordance with the present invention;

FIG. 2 is a diagrammatic side view in section of a heel corresponding to that in FIG. 1 but which in addition supports a film or coating deposited from a cellulose type lacquer;

FIG. 3 is a diagrammatic, fragmentary side view in section and in magnification taken along the line III—III of FIG. 2;

FIG. 4 is a diagrammatic side view in section of a Cuban heel produced in accordance with the present invention and including a block of wood located in its interior;

FIG. 5 is a diagrammatic side view in section of a footwear heel mold with the mold cavity open;

Figure 7:
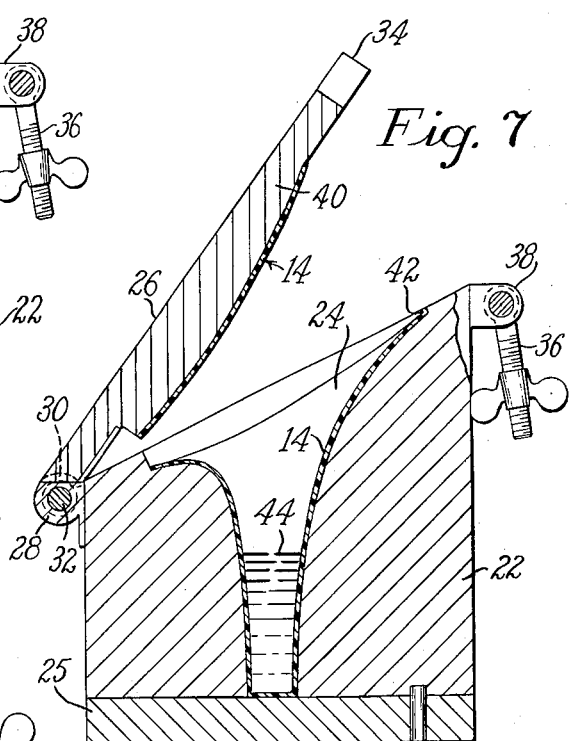
Figure 8:
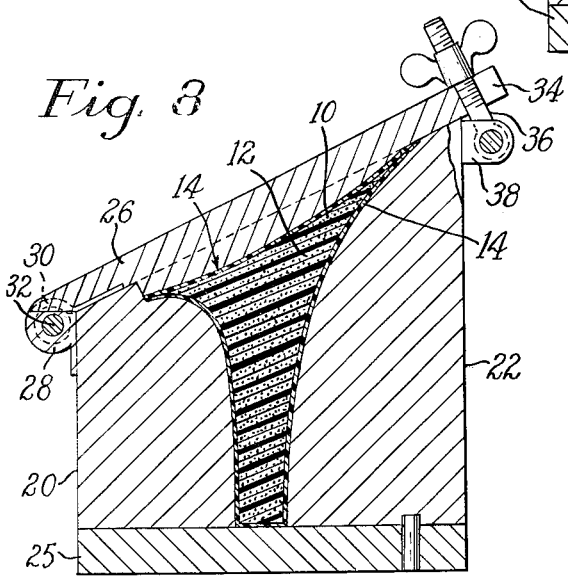

FIG. 7 is a diagrammatic side view in section of a footwear heel mold with the mold cavity open and containing a charge of foamable polyurethane; and FIG. 8 is a side view in section illustrating a footwear heel mold with the mold cavity closed and containing a molded footwear heel of polyurethane foam having the layer of thermoplastic synthetic polymeric material integrated to the surface of the foam.

Various embodiments of the molded footwear heel obtainable from practice of the present invention are shown in FIGS. 1 to 4. Specifically, FIG. 1 illustrates a spike heel 10 having an internal shaped structure 12 of rigid polyurethane foam and an integrated surface layer 14 of thermoplastic synthetic polymeric material. Surface layer 14 is shown on all surfaces of heel 10, despite the fact that only the upright surfaces are exposed in a finished shoe which includes the heel. This is done to take advantage of the mold release properties of surface layer 14. This aspect will be described in greater detail further on.

The polyurethane foam of shaped structure 12 is a rigid foam. As a result of its having a cross-linked nature, the foam has sufficient dimensional stability to stand up under the stresses applied with normal wearing. Under these conditions, structure 12 and of necessity footwear heel 10 will not be compacted or deformed more than a nominal amount. Other than that, the term "rigid" when used here to describe polyurethane foam is intended to be interpreted in the manner common to the polyurethane art; it differentiates from flexible foams. The polyurethane foam used in the molded structure 12 is preferably of the closed cell type.

It is common in shoemaking procedures for producing women's shoes to first attach a heel to an insole, and later provide the heel with a heel lift. Each of these steps generally relies on nailing as the attaching method. To accommodate each of these steps the polyurethane foam used in shaped structure 12 of footwear heel 10 is preferably of a density ranging 10 to 45 lbs./ft.$^3$ with a further preference of 15 to 25 lbs./ft.$^3$.

Surface layer 14 is constituted from a particular thermoplastic synthetic polymeric material which makes it possible for the molded footwear heel 10 of the present invention to be decorated or surface coated with a film or coating deposited from cellulose type lacquer 16, see FIGS. 2 and 3. FIG. 3 shows in greater detail the desirable structure and bonding properties which are obtained between foam structure 12 and surface layer 14 and which are attributable to the particular thermoplastic synthetic polymeric material used in the latter.

Structure 12 and layer 14 are adhesively bonded together in continuous interfacial relationship while nevertheless obtaining an exterior surface appearance on heel 12 which is smooth and attractive. The presence of voids at the interface between foam structure 12 and surface layer 14 are practically if not entirely non-existent. This desirable interfacial adhesion may be accomplished through practice of the invention even though no specific adhesives or fillers are disposed at the interface of foam structure 12 and surface layer 14. The smooth outer surface presented by surface layer 14 facilitates the application of a smooth and attractive nitrocellulosic type lacquer coating which on drying develops into a smooth film 16 which strongly adheres to surface layer 14. Best results are obtained in surface appearance when surface layer 14 has a thickness of greater than about 0.003 inch.

A second embodiment of a molded heel which may be obtained by practice of the present invention is shown in FIG. 4. There a Cuban heel 10a is shown constituted of a polyurethane foam structure 12 adhesively bonded in interfacial relationship to the surface layer 14 of thermoplastic synthetic material. For the purpose of economizing on the amount of foam used, or constituting a situs for attaching nails, or varying the density of the foam, a plug 18 of wood may be introduced to the interior of the foam structure 12. While plug 18 is shown constituted of wood it can as well be of other materials such as various plastics, resin impregnated paper or cloth and the like.

The molding process by which the foamed polyurethane footwear heel of the present invention may be produced is described with reference to FIGS. 5–8. In these figures a closable footwear heel mold 20 is illustrated constituting a mold blank 22 having a mold cavity 24 complementing in shape that of a lady's shoe heel, bottom plate 25, and, a cover plate 26. Mold block 22 and cover plate 26 are shown to be of metal construction. This anticipates that molding of the polyurethane to a rigid foam accompanies an exothermic reaction. Heat buildup from the reaction is kept at a minimum, or, at a point below that at which the layer of thermoplastic synthetic material will flow freely down the sides of the mold cavity 24 during molding of the polyurethane. If too much flow of this type takes place the layer of thermoplastic synthetic polymeric material which would then eventuate on structure 12 of molded heel 10 would be undesirable. Mold block 20 and cover 26 can be constituted of materials other than metal if desired.

To facilitate closing of mold cavity 24, mold block 22 is provided with a hinged cover plate 26. This includes perforated ears 28 and 30 on mold block 22 and cover plate 26, with pin 32 inserted through the perforations. Cover plate 26 can be secured in closed position relative to mold block 22 through a locking arrangement located on mold 20. As illustrated, this takes the form of a projection 34 located on cover plate 26 which is fitted with threaded locking belt 36, the latter having sufficient longitudinal extension to be threaded into complementary threaded projection 38 located on mold block 22. To lend contour to the top of the molded heel 10 as well as to insure close confining of mold cavity 24 when mold 20 is closed, mold plate 26 is provided at its underside with crown 40. Crown 40 has a projecting convex face and is designed to be inset into seat 42 extending upwardly from the top of mold cavity 24.

Figure 6:
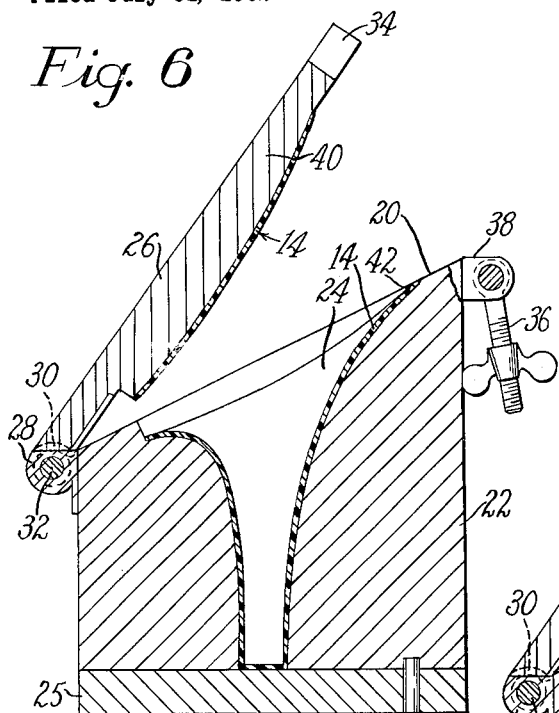
FIG. 6 is a diagrammatic side view in section of a footwear heel mold with the mold cavity open and the surface of the mold cavity and the crown inset of the mold cover each supporting a layer of thermoplastic synthetic polymeric material.

In practicing the molding process of this invention, footwear heel mold 20 is initially provided in the open position as shown in FIG. 5. Thermoplastic synthetic polymeric material in fluid, liquid or other convenient form is sprayed, or applied to the inside of mold cavity 24 using spraying or other convenient applicating apparatus, not shown. The liquid thermoplastic synthetic material is allowed to dry either at room temperature or at elevated temperatures in an oven or air blast, using apparatus for this purpose which is not shown. To expedite drying or to practice flash application mold 20 may be preheated. The result of drying is a continuous layer 14 of thermoplastic synthetic polymeric material supported on the surface of mold cavity 24, as illustrated in FIG. 6.

As illustrated in FIG. 7, a quantity of liquid, catalyzed, foamable polyurethane 44 is next charged into mold cavity 24, and, cover plate 26 is lowered to close mold cavity 24. Reaction of the polyurethane, which is exothermic in nature, proceeds with the liquid polyurethane converting into a rigid foamed structure which fills mold cavity 24. The result is illustrated in FIG. 8. With expansion, surface portions of polyurethane impress themselves into layer 14 facilitating the establishment of integrated interfacial adhesive bonding between the foam structure 12 and surface layer 14.

The molded footwear heel of the present invention has a shaped structure of rigid polyurethane foam. An illustrative method for obtaining fluid, foamable polyurethanes capable of being molded into such a structure is as follows. An excess of polyisocyanate is reacted with an organic compound such as a polyester having at least two reactive hydrogen atoms to join molecules of the latter compound together through urethane linkages. The product of this reaction is a prepolymer of increased molecular weight containing terminal isocyanate groups, which is fluid in nature. Water and catalyst are added to the prepolymer prior to molding. The water reacts with the isocyanate groups of the prepolymer forming urea linkages and carbon dioxide. The urea linkages serve to cross link the polymer while the carbon dioxide, together with carbon dioxide formed through reaction between the water and the isocyanate groups of any unreacted polyisocyanate, serve to expand the viscous reaction mass. The reaction mass hardens to produce a rigid polyurethane foam. Preferably polyesters are used which have molecular weights of at least 500 and hydroxyl numbers of not more than 225. Suitable polyisocyanates for use include ethylene diisocyanate; ethylidene diisocyanate; propylene-1,2-diisocyanate; butylene - 1,3 - diisocyanate; hexylene - 1,6-diisocyanate; cyclohexylene diisocyanate; tolylene diisocyanate; 3,3'-diphenyl 4,4'-biphenylene diisocyanate; 3,3'dichloro-4,4'-biphenylene diisocyanate; triphenylmethane triisocyanate; 1,5-naphthylene diisocyanate; and the like. The catalysts used may be selected from a wide variety of tertiary amines, such as N-methyl morpholine; triethylamine; diethylethanol amine; and diethanolamine. Mixtures of two or more different catalysts may be used and in some instances, catalysts which are buffered by partially neutralizing them with a strong mineral acid, such as hydrochloric acid, may also be used.

Any convenient method and apparatus may be used to mix the various constituents in providing the foamable polyurethane prior to injection into the heel mold. One method for doing so is disclosed in U.S. Patent 2,764,565.

The surface layer of thermoplastic synthetic polymeric material is marked by its ability to strongly bond with films or coatings deposited from cellulose type lacquers. This reflects the particular thermoplastic synthetic polymeric material from which the surface layer is formed. In addition the thermoplastic synthetic polymeric material is such that the surface layer which is provided in the manner of this invention is continuous in nature, smooth in exterior appearance and strongly adheres in continuous interfacial relationship with the rigid polyurethane foam structure of the featured heel. Another attractive and important property of the surface layer and one which is dependent upon the choice of the thermoplastic synthetic polymeric material from which the surface layer is formed is its attractive mold release property. After molding, the featured heels, constituted of internal polyurethane foam structures having surface layers of the particular thermoplastic synthetic polymeric material, can be removed from metal footwear heel molds with at most gentle tapping of the molds. This serves two functions, the one of providing ease and economy of operation to the molding process and the second that of insuring that the surface layer is not torn away from the internal foam structure or otherwise damaged or disrupted during removal from the mold. Then, contrasting with conventional mold release agents, the surface layer which in the present invention acts in this manner is removed from the mold as part of the molding. Consequently, no necessity for cleaning the mold cavities or covers of the mold release agent arises after molding. As indicated these properties and benefits reflect the particular thermoplastic synthetic materials from which the layer is formed. These materials can be generally described as acrylonitrile, styrene and butadiene copolymers. More specifically they include 15 to 35% acrylonitrile, 20 to 50% butadiene and 15 to 65% styrene in copolymerized form. Graft copolymers produced by grafting acrylonitrile and styrene on polybutadiene or GR-S rubber are preferred. These polymers have a tensile strength range of 2500 to 5000 p.s.i.; Rockwell hardness range of 90 to 110 on the R scale; notched Izod impact range of 3 to 10, and Elmendorf of 8.5 to 11.0 (0.002 inch thickness). The thermoplastic synthetic polymeric material is generally applied to the surface of the mold cavity initially in the form of a solution on an organic solvent such as methyl ethyl ketone, methyl isobutyl ketone and the like. Convenient solutions for use in this manner may have solids content ranges of 10 to 40 parts by weight. Diluents can also be used in preparing these solutions. In addition to solutions, dispersions and direct spray techniques can be used.

Molded footwear heels made in accordance with the present invention are adapted to be surface coated with cellulose type lacquers. The solidified lacquer coatings which result from spraying or otherwise applying the lacquers and drying them strongly adhere to the thermoplastic synthetic polymeric material forming the surface layers on these molded heels. This is so, even at the sharp corners of the heel.

Cellulose type lacquers are well known coating compositions. In addition to nitrocellulose, other esters of cellulose may be used as well as cellulose ethers. Various preparations of these lacquers can be found, for example see in U.S. 1,855,181; U.S. 2,111,461; U.S. 2,159,384 and other equally accessible sources.

The following example is provided for the purpose of further illustrating the present invention. When parts are mentioned parts by weight are intended unless otherwise defined.

*Example I*

(A) *Surface layer preparation and provision.*—A number of sprayable compositions are prepared having the following formulations:

Table I

Sprayable composition:                     Amounts (p.p.w.)
   (1) Acrylonitrile/styrene butadiene graft copolymer (25% acrylonitrile, 35% butadiene and 40% styrene) _____ 15
   (2) Methyl ethyl ketone _____ 45
   (3) Methyl isopropyl ketone _____ 40

A number of two-part metal molds the mold cavities of which have effective volumes of 32.8 cc. and shapes complementing that of spike heels for a lady's shoe size 10 are preheated to 100–130° F. The compositions of Table I above are each sprayed onto surfaces of the mold cavities and projecting crowns located on the mold cover plates of the molds. Spraying is carried out under reduced air pressure of 10–30 p.s.i. The amount of composition sprayed on is calculated to obtain on drying a continuous surface layer of 0.003 to 0.005 inches in thickness. Drying is carried out in a circulating air oven set at 130° F. The time for drying is about 3.0 minutes.

(B) *Shaped structure material preparation and molding.*—A polyurethane prepolymer is prepared by reacting 900 parts of castor oil with 525 parts of toluene diisocyanate. The reaction is carried out by heating the mass at 100° C. for a period of 60 minutes. A reaction addition is made up separately by mixing 130 parts of a pentol which is a condensation product of diethylene triamine and propylene oxide with 80 parts of castor oil, 2 parts of tetramethyl butane diamine (catalyst) 1 part of dibutyl tin dilaurate (catalyst) and 1 part of water.

The prepolymer and reaction addition are mixed together in the ratio of 1:1 parts respectively to obtain a foamable molding composition. The molding composition is charged into the mold cavities obtained from A above in amounts of 15.0 grams. This amount serves to provide molded heels having a density of 25.0 lbs./ft.$^3$. At this density the heels exhibit both nailability and nail holding power both at the heel seat and top lift ends. The cover plate of the mold is closed and locked, and a reaction-molding time of about ten minutes is allowed. Thereafter, the molds are opened and the molded footwear heels removed by gently tapping the molds. Note that removal of the heel is accomplished in this easy fashion despite the fact that a separate mold release agent is not applied to the walls of the mold cavity prior to spraying on the solution containing the acrylonitrile, -butadiene, -styrene copolymer from which the surface layer is formed.

The footwear heels made above exhibit a smooth exterior appearance. They can be fitted with heel lifts resistant to 8 to 15 lbs. direct pull when nailed on with 5 top lift slugs (0.37 inch length x 0.040 inch shank thickness) using ordinary nailing procedures.

When the footwear heels made above are sliced along their longitudinal axes and inspected under 100× magnification it may be noted that the surface layers are adhesively bonded in continuous interfacial relationship to the polyurethane foam structures. The inner faces of the surface layers are contiguous with the outer faces of the foam structure, with no perceptible voids existing at the interfaces so formed.

(C) *Nitrocellulose lacquer preparation and spraying.*—The exterior surface of a number of molded heels produced in accordance with the above procedure are sprayed with a nitrocellulose lacquer having the following composition.

LACQUER COMPOSITION

Amounts (parts)
(1) Solids (29% of total lacquer weight):
Nitrocellulose (½ second) _____ 10.0
Phenolformaldehyde resin (resole) _____ 6.0
Oil modified sebacic alkyd with excess hydroxyl groups _____ 4.0
Dibutyl phthalate _____ 1.5
Raw castor oil _____ 1.5
Carbon black _____ 5.0
(2) Solvent system (71% of total lacquer weight):
n-Butyl acetate _____ 20
n-Butanol _____ 10
Isopropanol _____ 10
Toluene _____ 50
Glycol ester _____ 10

After spraying the heels are placed on racks in a drying chamber and allowed to stand at room temperature for 15 minutes. Upon removal from the chamber the heels are noted to have excellent surface appearance, the decorative film being smooth and continuous in nature.

After aging for 24 hours, the lacquer coated heels are tumbled in an abrading medium consisting of smooth, round beach stones (approximately No. 1 aggregate) for five minutes. The nitrocelulose type lacquer coating remains essentially intact, more precisely, the heels remain covered with coating, but their appearance is somewhat dulled. The portion of the coating which is removed with tumbling is then extracted by vacuum from the tumbler and examined. This material is noted to be of very fine particles size. By contrast, heels molded entirely of polyurethane foam and coated directly with the nitrocellulose lacquer in the same manner are characterized by being completely stripped of the lacquer coating and the coating material removed from the tumbler is of larger particle size. Both of these characteristics are clearly indicative of the far greater susceptibility for peeling shown by the latter heel as compared to the heels produced in accordance with the present invention.

Lacquered footwear heels molded in accordance with the exemplified process are again sliced along their longitudinal axes and observed under 100× magnification. From this it may be noted that (a) in each heel the surface layer remains adhesively bonded in continuous interfacial relationship with the foam structure of the heels. The interface formed between the foam structure and the surface layer is continuous and neither are there voids in evidence at the interface. No pulling away caused by the lacquering step is in evidence. Then (b) in each heel a continuous interface is exhibited between the surface layer and the lacquer film or coating which is indicative of strong bonding between these two.

It will thus be seen that the objects set forth above, among those made apparent from the preceding description are efficiently attained and since certain changes may be made in carrying out the above molding process and in the footwear heels set forth without departing from the scope of the invention, it is intended that all matter contained in the above description and in the accompanying drawings shall be interpreted as illustrative and not in a limiting sense.

Having thus described my invention, what I claim as new and desire to secure by Letters Patent of the United States is:

1. A molded footwear heel of rigid polyurethane foam having an exterior surface to which a film deposited from a cellulose type lacquer strongly adheres, the said heel comprising a shaped structure of rigid polyurethane foam and a surface layer of acrylonitrile-butadiene-styrene polymeric material bonded together in continuous interfacial relationship.

2. A molded footwear heel according to claim 1 wherein the polyurethane has a density of 10 to 45 pounds per cubic foot.

3. A molded footwear heel according to claim 1 wherein the polyurethane has a density of 15 to 25 pounds per cubic foot.

4. A molded footwear heel according to claim 1 wherein the polymeric material is a copolymer of 15 to 25% acrylonitrile, 20 to 50% butadiene and 15 to 65% styrene.

5. A molded footwear heel according to claim 1 wherein the surface layer of polymeric material has a thickness of greater than about 0.003 inch in thickness.

6. A surface decorated molded footwear heel comprising a shaped structure of rigid polyurethane foam and a surface layer of acrylonitrile-butadiene-styrene polymeric material bonded together in continuous interfacial relationship and a film deposited from cellulose type lacquer strongly bonded onto the exterior surface of said surface layer.

7. A surface decorated molded footwear heel according to claim 6 wherein the cellulose type lacquer material is a nitrocellulose lacquer.

References Cited by the Examiner

UNITED STATES PATENTS

| | | | |
|---|---|---|---|
| 1,710,378 | 4/1929 | Owen | 36—34 |
| 1,781,931 | 11/1930 | Owen | 36—35 |
| 2,236,552 | 4/1941 | Ushakoff | 36—34 |
| 2,968,106 | 1/1961 | Joiner et al. | 36—34 |
| 2,985,919 | 5/1961 | Borroff et al. | 18—59 |
| 2,985,920 | 5/1961 | Borroff et al. | 18—59 |

FRANK J. COHEN, *Primary Examiner.*

DAVID J. WILLIAMOWSKY, *Examiner.*